United States Patent
Su (10) Patent No.: US 10,660,040 B2
(45) Date of Patent: *May 19, 2020

(54) TECHNIQUES FOR MANAGING WIRELESS TRANSMISSION ENERGY BUDGET

(71) Applicant: Apple Inc., Cupertino, CA (US)

(72) Inventor: Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,906

(22) Filed: Oct. 10, 2018

(65) Prior Publication Data

US 2019/0045450 A1 Feb. 7, 2019

Related U.S. Application Data

(63) Continuation of application No. 15/076,226, filed on Mar. 21, 2016, now Pat. No. 10,123,277.

(51) Int. Cl.
*H04W 52/02* (2009.01)

(52) U.S. Cl.
CPC ... *H04W 52/0258* (2013.01); *H04W 52/0261* (2013.01); *H04W 52/0277* (2013.01);
(Continued)

(58) Field of Classification Search
CPC ......... H04W 52/0258; H04W 52/0261; H04W 52/0277; H04W 40/16; H04W 40/246;
(Continued)

(56) References Cited

U.S. PATENT DOCUMENTS

| 8,175,100 B2 | 5/2012 | Goteti et al. |
| 9,048,993 B2 | 6/2015 | Khandekar et al. |

(Continued)

FOREIGN PATENT DOCUMENTS

| EP | 2 111 076 | 10/2009 |
| EP | 2 427 001 | 3/2012 |

(Continued)

OTHER PUBLICATIONS

International Search Report and Written Opinion, Application No. PCT/US2017/013673, dated Apr. 7, 2017, 13 pages.

(Continued)

*Primary Examiner* — Shaima Q Aminzay
(74) *Attorney, Agent, or Firm* — Kowert Hood Munyon Rankin and Goetzel PC; Jeffrey C. Hood (57) ABSTRACT

Techniques are disclosed relating to wireless transmission energy budgets. In some embodiments, an apparatus is configured to determine wireless transmission energy budget for a plurality of time periods. In some embodiments, the apparatus determines budget differently depending on whether it is in a thermal mode or a peak power mode. In some embodiments, the apparatus blanks scheduled wireless transmissions that intersect with the battery signal. In some embodiments, for a time interval subsequent to assertion of the battery signal, the apparatus operates in the peak power mode and determines energy budget for periods based on an amount of energy used for wireless transmissions in a most recent period in which transmissions were blanked in response to the battery signal. In some embodiments, in the thermal mode, the energy budget is based on thermal information for the apparatus, but may also allow carryover of unused budget from previous periods.

20 Claims, 6 Drawing Sheets

Determine a respective wireless transmission energy budget for each of a plurality of time periods, where the wireless transmission energy budget for at least a first period is based on an amount of unused energy budget in a previous period
702

Schedule wireless transmissions for the plurality of time periods based on the respective energy budgets
704

Cause at least a portion of the scheduled wireless transmissions to be performed for the plurality of time periods
706

(52) U.S. Cl.
CPC .......... *Y02D 70/00* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/23* (2018.01); *Y02D 70/24* (2018.01); *Y02D 70/26* (2018.01)

(58) Field of Classification Search
CPC ... H04W 72/082; H04W 84/18; H04W 8/005; Y02D 70/00; Y02D 70/1242; Y02D 70/1244; Y02D 70/1262; Y02D 70/1264
USPC ....................................................... 455/574
See application file for complete search history.

(56) References Cited

U.S. PATENT DOCUMENTS

| | | | |
|---|---|---|---|
| 9,141,166 B2 | 9/2015 | Sistla et al. | |
| 10,123,277 B2 * | 11/2018 | Su ..................... | H04W 52/0258 |
| 2009/0257369 A1 | 10/2009 | Igarashi et al. | |
| 2012/0135696 A1 | 5/2012 | Lerzer et al. | |
| 2013/0102309 A1 | 4/2013 | Chande et al. | |
| 2013/0123999 A1 | 5/2013 | Pereira | |
| 2015/0192889 A1 | 7/2015 | Osawa | |
| 2016/0064940 A1 | 3/2016 | De La Cropte De Chanterac et al. | |
| 2016/0066276 A1 | 3/2016 | Su et al. | |
| 2016/0309390 A1 | 10/2016 | Yi et al. | |

FOREIGN PATENT DOCUMENTS

| | | |
|---|---|---|
| JP | 2007531429 A | 11/2007 |
| JP | 2008092160 A | 4/2008 |
| JP | 2012526431 A | 10/2012 |
| WO | WO 2010/127725 A1 | 11/2010 |
| WO | WO 2015102447 | 7/2015 |

OTHER PUBLICATIONS

Notice of Preliminary Rejection, Korean Patent Application No. 10-2018-7024693, dated Jun. 14, 2019, five pages.

Notice of Allowance, Japanese Patent Application No. 2018-545652, dated Jul. 16, 2019, three pages.

* cited by examiner

TECHNIQUES FOR MANAGING WIRELESS TRANSMISSION ENERGY BUDGET

PRIORITY CLAIM

This application is a continuation of U.S. patent application Ser. No. 15/076,226 titled "Techniques for Managing Wireless Transmission Energy Budget", filed on Mar. 21, 2016, which is hereby incorporated by reference in its entirety as though fully and completely set forth herein.

The claims in the instant application are different than those of the parent application or other related applications. The applicant therefore rescinds any disclaimer of claim scope made in the parent application or any predecessor application in relation to the instant application. The examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, and in particular to determining an energy budget for wireless transmissions.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have had limited wireless communications capabilities and were capable of communicating only over wired interfaces or short-range point-to-point technologies. Wearable devices typically have smaller batteries than larger portable devices, such as smart phones and tablets. Wearable devices also may have different thermal characteristics that larger devices, e.g., because of their small size. Wireless transmissions using wearable devices may cause current spikes and/or thermal spikes which can damage equipment and substantially reduce battery life.

SUMMARY

Embodiments are presented herein of, inter alia, wireless circuitry for a mobile device such as an accessory device, and associated methods for determining and satisfying a wireless transmission energy budget.

In some embodiments, an apparatus is configured to determine wireless transmission energy budget for a plurality of time periods, which may be consecutive and non-overlapping. The length of the time periods is 40 ms in some embodiments, but may be programmable or may vary in different embodiments. In some embodiments, the apparatus determines budget differently depending on whether it is in a thermal mode or a peak power mode. The apparatus may enter the peak power mode in response to a battery signal, e.g., indicating that battery voltage has dropped. In some embodiments, the apparatus blanks scheduled wireless transmissions that intersect with the battery signal. In some embodiments, for a time interval subsequent to assertion of the battery signal, the apparatus operates in the peak power mode and determines energy budget for periods based on an amount of energy used for wireless transmissions in a most recent period in which transmissions were blanked in response to the battery signal. In some embodiments, in the thermal mode, the energy budget is based on thermal information for the apparatus, but may also allow carryover of unused budget from previous periods. In some embodiments the disclosed techniques may allow for efficient wireless transmission by link-budget-limited devices while satisfying thermal and/or power constraints.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Figure 1:
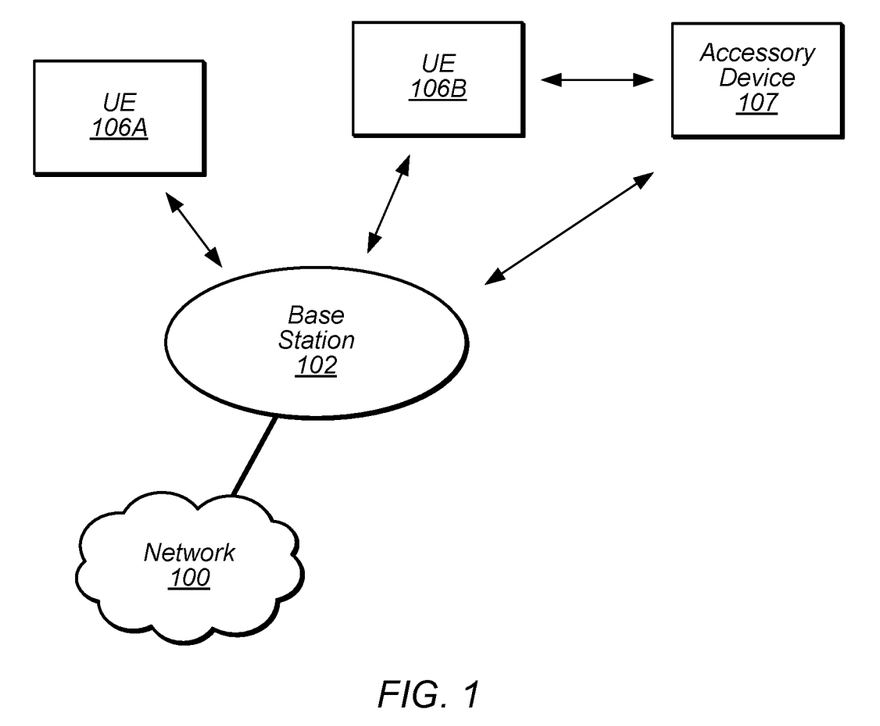
FIG. 1 illustrates an example wireless communication system including an accessory device.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107. The accessory device 107 may be any of various types of devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., dues to conditions such as current battery status, inability to access a network, or poor reception.

Figure 2:
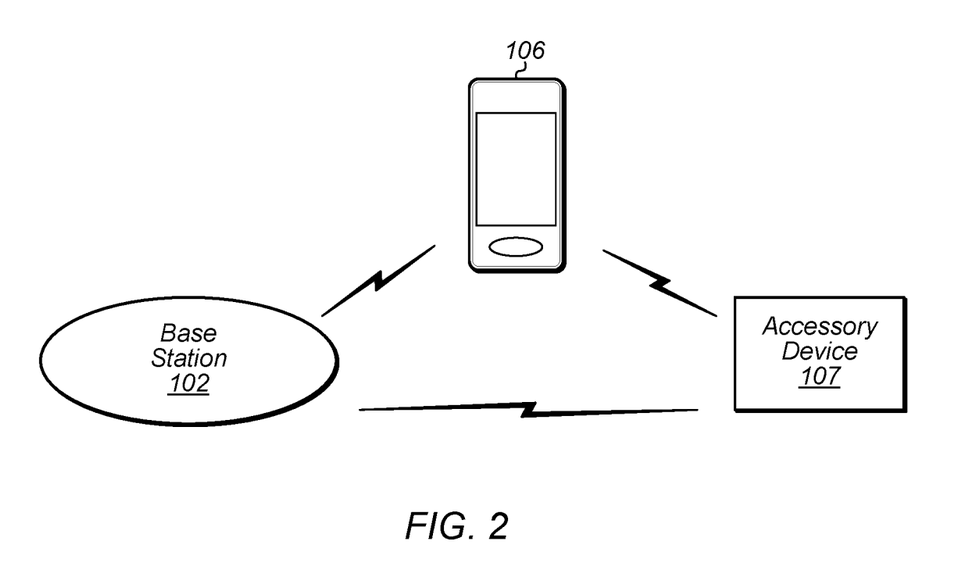
FIG. 2 illustrates an example system where an accessory device can selectively either directly communicate with a cellular base station or utilize the cellular capabilities of an intermediate or proxy device such as a smart phone.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol, and may then use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of handheld device, a media player, a computer, a laptop or virtually any type of wireless device.

When the accessory device 107 is configured to indirectly communicate with the base station using the cellular functionality of an intermediate or proxy device, the accessory device may be said to be in "relay mode."

The accessory device 107 may include a processor that is configured to execute program instructions stored in memory. The accessory device 107 may perform any of the method embodiments described herein by executing such stored instructions. Alternatively, or in addition, the accessory device 107 may include a programmable hardware element such as an FPGA (field-programmable gate array), or other circuitry, that is configured to perform any of the method embodiments described herein, or any portion of any of the method embodiments described herein.

The accessory device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE (or LTE-Advanced) or Bluetooth, and separate radios for communicating using each of LTE-Advanced and Bluetooth. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with WiFi capabilities (and possibly limited or no cellular communication capabilities) which is not currently near a WiFi hotspot and hence is not currently able to communicate over WiFi with the Internet. Thus, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
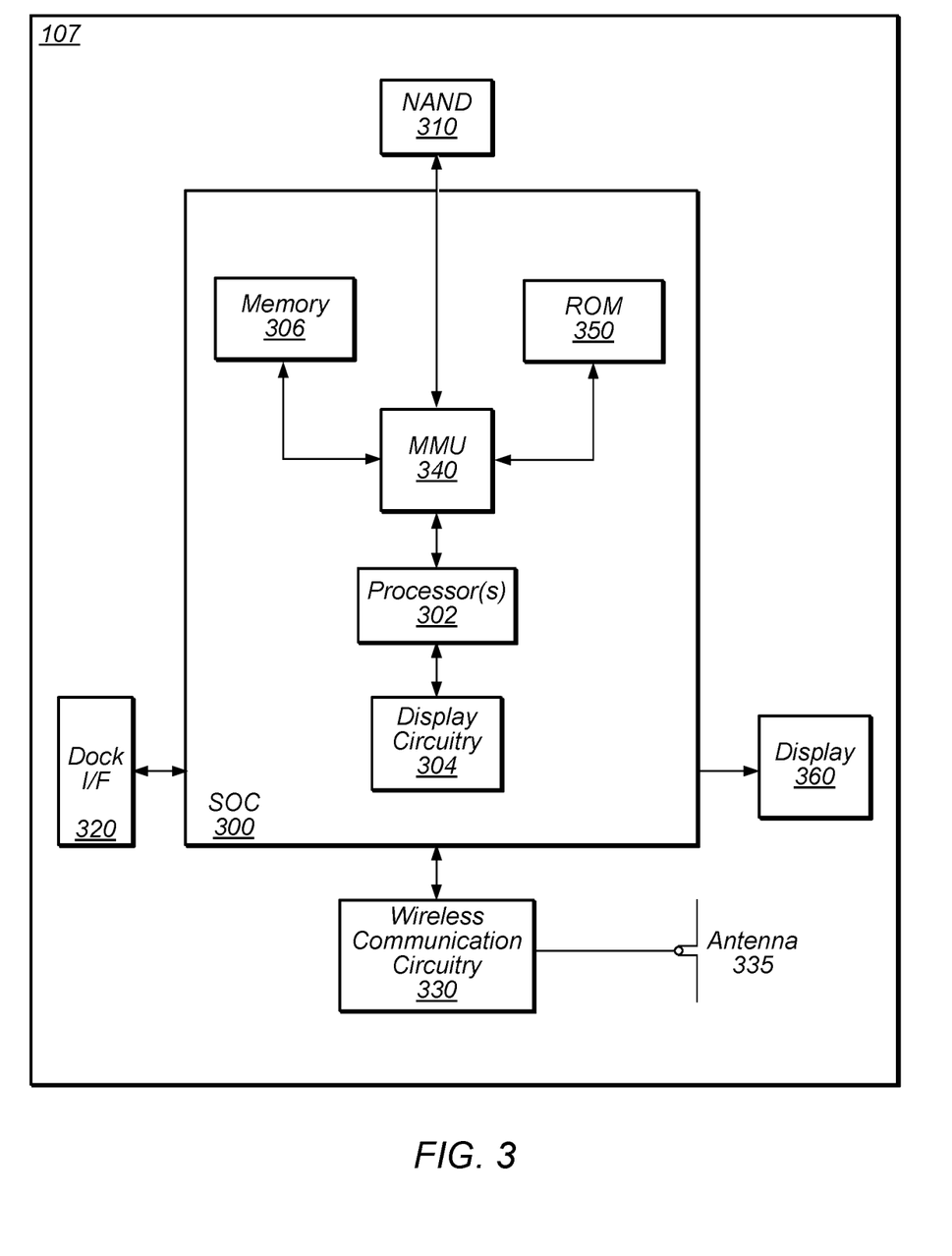
FIG. 3 is a block diagram illustrating an example accessory device.

FIG. 3—Example Block Diagram of an Accessory Device

FIG. 3 illustrates one possible block diagram of an accessory device 107. As shown, the accessory device 107 may include a system on chip (SOC) 300, which may include portions for various purposes. For example, as shown, the SOC 300 may include processor(s) 302 which may execute program instructions for the accessory device 107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The accessory device 107 may also include other circuits or devices, such as the display circuitry 304, radio 330, connector I/F 320, and/or display 340. In some embodiments, the accessory device includes or is coupled to a battery (not shown) and may include sensor circuitry (not shown) that is configured to assert various signals based on battery voltage characteristics such as voltage level, voltage slope, voltage pattern detection, etc.

In the embodiment shown, ROM 350 may include a bootloader, which may be executed by the processor(s) 302 during boot up or initialization. As also shown, the SOC 300 may be coupled to various other circuits of the accessory device 107. For example, the accessory device 107 may include various types of memory, a connector interface 320 (e.g., for coupling to a computer system), the display 360, and wireless communication circuitry (e.g., for communication using LTE, CDMA2000, Bluetooth, WiFi, NFC, GPS, etc.).

The accessory device 107 may include at least one antenna, and in some embodiments multiple antennas, for performing wireless communication with base stations and/or other devices. For example, the accessory device 107 may use antenna 335 to perform the wireless communication. As noted above, the UE may in some embodiments be configured to communicate wirelessly using a plurality of wireless communication standards or radio access technologies (RATs).

As described herein, the accessory device 107 may include hardware and software components for implementing methods according to embodiments of this disclosure. The processor 302 of the accessory device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

It is noted that the UEs 106A and 106B shown in FIG. 1 may have a similar architecture to that described above.

Exemplary Control of Transmission Energy Budget

Figure 4:
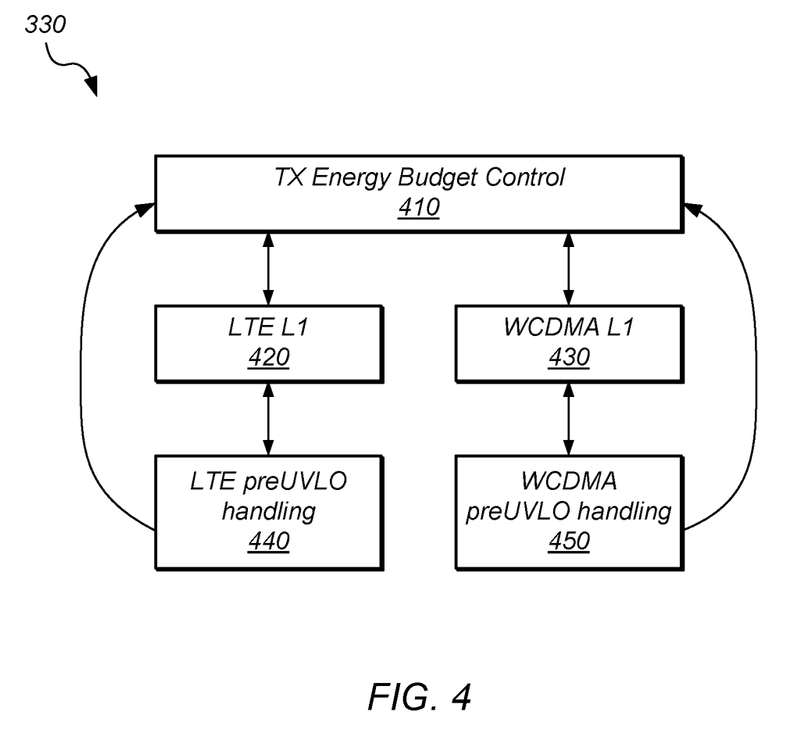
FIG. 4 is a block diagram illustrating wireless communication circuitry, according to some embodiments.

FIG. 4 is a block diagram illustrating exemplary modules, which may be located in wireless communication circuitry 330 in some embodiments. In other embodiments, these modules may be implemented elsewhere. The illustrated modules may be implemented using software, firmware, or dedicated circuitry, in various embodiments. In the illustrated embodiment, wireless communication circuitry 330 includes transmission (TX) energy budget control module 410, LTE L1 module 420, WCDMA L1 module 430, LTE preUVLO handling module 440, and WCDMA preUVLO handling module 450.

UVLO refers to an "undervoltage-lockout" signal which is used to turn off power to particular circuitry (or an entire device) when supply voltage drops below a threshold value. For example, if the battery voltage from an accessory device drops below a certain threshold (often due to a current spike, e.g., when multiple components are operating simultaneously), a UVLO signal may power down the accessory device or components thereof. In some embodiments a "preUVLO" signal indicates that a UVLO signal may be asserted soon, e.g., because supply voltage conditions are deteriorating. In some instances, taking action based on the preUVLO signal may enable the device to avoid asserting UVLO.

Therefore, in the illustrated embodiment, modules 440 and 450 are configured to receive or generate and handle preUVLO signals. These modules are included in RF drivers, in some embodiments. In other embodiments, these modules are implemented using dedicated circuitry.

In the illustrated embodiment, L1 modules 420 and 430 are configured to perform L1 physical layer processing for LTE and WCDMA communications respectively. In some embodiments, these modules are implemented in firmware.

TX energy budget control module 410 (which may also be referred to as "energy budget module 410") is configured to schedule wireless transmissions based on an energy budget, in some embodiments. In some embodiments, energy budget module 410 determines the energy budget based on battery signals (such as a preUVLO signal), thermal signals, previous use of energy budget, blanked transmissions, etc. In some embodiments, module 410 is software, while in other embodiments module 410 is implemented, at least in part, using dedicated circuitry.

In some embodiments, energy budget module 410 is configured to rapidly adjust energy budget by blanking scheduled transmissions in response to a battery signal such as a preUVLO signal. In some embodiments, energy budget module 410 is configured to blank any scheduled wireless transmissions during intervals in which preUVLO is asserted.

As used herein, the term "blanking" refers to canceling a scheduled wireless transmission such that the transmission is not performed. Note that some transmissions may be allowed to occur during a blanking interval while other transmissions (e.g., with different scheduled time and/or frequency resources) may be blanked.

In some embodiments, energy budget module 410 is also configured to perform longer term budget control. In some embodiments, energy budget module 410 is configured to determine energy budgets at the granularity of periods or cycles of operation. In some disclosed embodiments, 40 millisecond cycles are implemented, but cycles of various lengths may be used in various other embodiments. In some embodiments, the cycle length is determined to provide fast response for power and thermal control while providing enough samples for handling preUVLO signaling. 40 ms may map, in some embodiments, to the duration of two audio frames, a common voice over LTE (VoLTE) discontinuous reception (DRX) length, and/or a transmission time interval (TTI) commonly used in WCDMA communications, for example. Once the energy budget for a particular cycle has been determined, wireless communication circuitry 330 may schedule transmission for that cycle to stay within the budget (although blanking of scheduled transmissions may occur based on the preUVLO signal, for example).

The following parameters may be used in some embodiments in the context of determining energy budget for a cycle. These parameters are discussed for illustrative purposes but are not intended to limit the scope of the present disclosure. In other embodiments, other similar parameters may be used to determine energy budget.

E-preUVLO: energy that is not used in a cycle because of blanking triggered by preUVLO signals. For example, if two transmissions in a given cycle are blanked, E-preUVLO for that cycle corresponds to the sum of the energy that the two transmissions would have used.

E-cltm: a maximum allowed energy budget in a cycle that is assigned based on component-level thermal management (cltm). This is one example of a parameter based on thermal information. Each component may include one or more thermal sensors configured to generate information that may be used to determine E-cltm, in some embodiments.

E-budget: TX energy budget for a cycle.

E-scheduled: TX energy that is scheduled by baseband for use in a given cycle.

E-used: TX energy used in a cycle. E-used=E-scheduled−E-preUVLO. Said another way, the energy that is used in a given cycle is the energy of scheduled transmissions during the cycle minus the energy of scheduled transmissions that are blanked.

E-leftover: the budgeted TX energy in a cycle that is not used. E-leftover=E-budget−E-used. Said another way, the leftover energy for a given cycle is the difference between the energy budget for that cycle and the actual energy used to transmit in that cycle.

E-min, E-max: the minimum and maximum budget respectively that can be used for a cycle. In some embodiments, these parameters are programmable. E-min may be low or may be zero, in some situations or embodiments.

T-pp: a configurable timer which is started or re-started when the preUVLO signal is received in a cycle. In various examples herein, the T-pp duration is 120 ms, but the duration may be programmable or may be fixed at some other value. In some embodiments, accessory device 107 operates in a "peak power mode" as long as T-pp is running but operates in a "thermal mode" otherwise. Speaking generally, T-pp is used to measure an interval that occurs subsequent to assertion of a battery signal.

In some embodiments, energy budget module 410 is configured to determine E-budget for a current cycle differently depending on whether it is operating in peak power mode or in thermal mode. In some embodiments, in thermal mode, E-budget is the lesser of (1) E-leftover from previous cycle+E-cltm for current cycle or (2) E-max. This may allow unused energy from the previous cycle to augment the current thermal budget, so long as E-max is not exceeded. In some embodiments, E-leftover is 0 if E-cltm is changed in a current cycle.

In some embodiments, in peak power mode, E-budget is the lesser of (1) E-cltm for the current cycle or (2) the greater of ((a) E-used from the most recent cycle in which preUVLO was asserted or (b) E-min). In some embodiments, this may result in the budget being restricted to the amount of energy used in the cycle that blanking occurred in situations where this energy is smaller than E-cltm and greater than E-min.

In some LTE embodiments, E-min corresponds to transmitting at full power (e.g., 23 dBm) five times (e.g., one PDU transmission and four retransmissions). In some WDCMA embodiments, E-min corresponds to transmitting for 10 ms of DPCCH transmissions at peak power. In other embodiments, E-min may be have any of various appropriate values and/or may be programmable.

Figure 5:
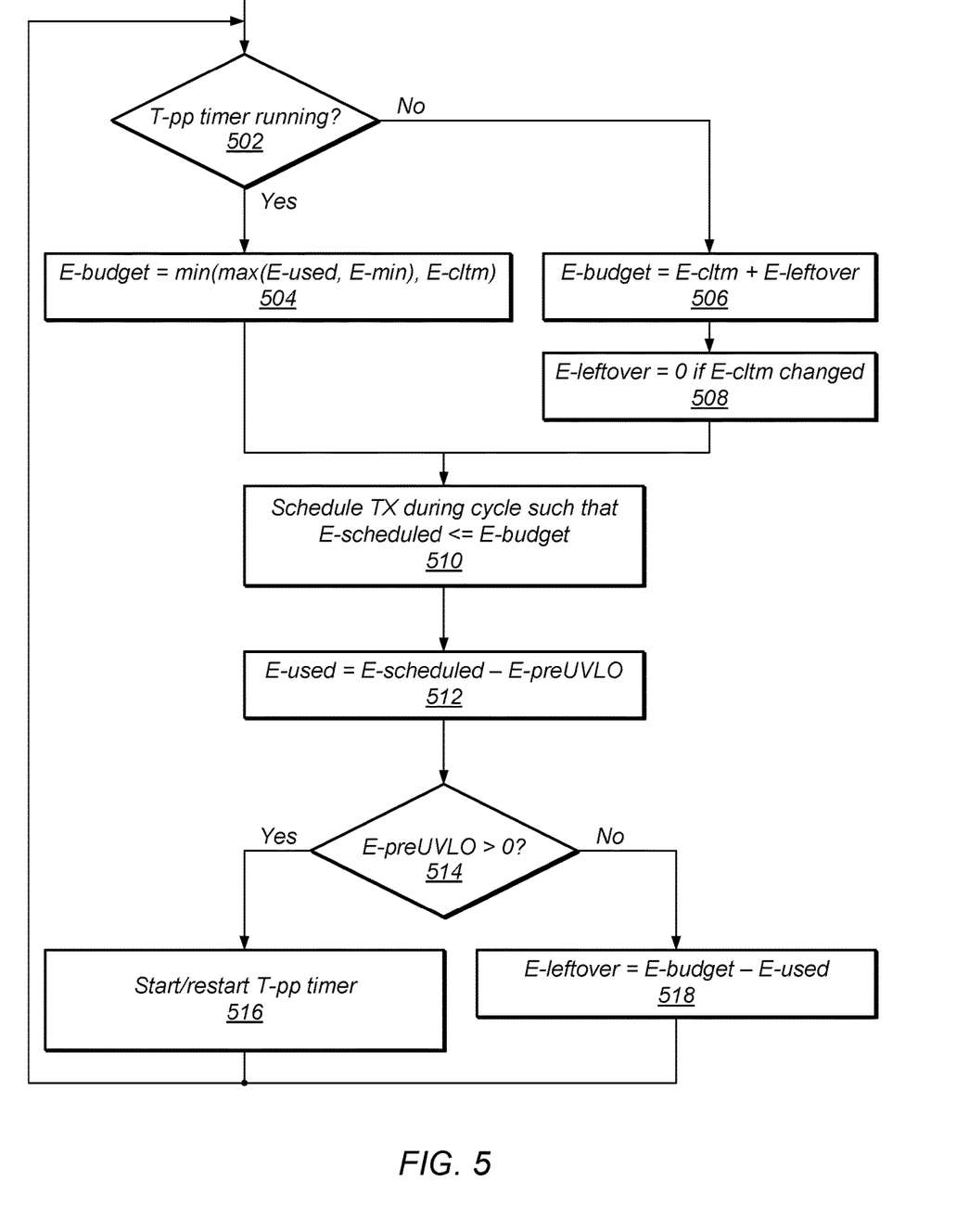
FIG. 5 is a flow diagram illustrating a method for determining wireless transmission budget for a cycle, according to some embodiments.

FIG. 5 is a flow diagram illustrating a method for determining E-budget for a cycle, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 502, in the illustrated embodiment, energy budget module 410 determines whether the device is in peak power mode or in thermal mode based on whether the T-pp timer is running. If the timer is running, flow proceeds to 504.

At 504, in the illustrated embodiment, energy budget module 410 determines E-budget based on energy used in the last cycle in which blanking occurred (E-used), E-min, and E-cltm, according to the illustrated equation: E-budget=min(max(E-used, E-min), E-cltm).

If the T-pp timer is not running in step 502, flow proceeds to 506 in which energy budget module 410 determines E-budget based on based on thermal information (E-cltm in the illustrated embodiment) and an amount of unused budget from the previous cycle, according to the illustrated equation: E-budget=E-cltm+E-leftover.

At 508, in the illustrated embodiment, E-leftover for the current cycle is set to zero if E-cltm changed. This may avoid excess energy usage caused by leftover budget in cases where thermal conditions deteriorate, for example. In other embodiments, E-leftover may not be set to zero when E-cltm changes, but may be adjusted in response to the change.

At 510, in the illustrated embodiment, wireless communication circuitry 330 schedules transmissions for the current cycle such that E-scheduled is smaller than or equal to E-budget. In some embodiments, the scheduling may be performed such that E-scheduled is also smaller than E-max. Examples of such scheduling for LTE and WCDMA communications are discussed in further detail below.

During a given cycle (e.g., beginning at step 502 and ending at step 516 or 518 in the illustrated embodiment), wireless communication circuitry 330 may blank one or more scheduled transmissions in response to preUVLO being asserted. In other cycles, no blanking may occur.

At 512, in the illustrated embodiment, energy budget module 410 determines E-used based on E-scheduled and E-preUVLO. Energy budget module 410 may determine E-used near the end of the cycle such that E-preUVLO reflects any blanking that occurred during the cycle.

At 514, in the illustrated embodiment, energy budget module 410 determines whether E-preUVLO was asserted during the current cycle. If so, flow proceeds to 516 and the T-pp timer is started or restarted (e.g., to 120 ms). If not, flow proceeds to 518 and E-leftover is set based on the current budget and the energy used in the current cycle: E-leftover=E-budget−E-used. From 516 and 518, flow proceeds back to 502 and the method may be repeated for one or more subsequent cycles. In some embodiments, at least a portion of the method of FIG. 5 is repeated for each cycle and associated time period.

In some embodiments, the disclosed method may allow for efficient wireless transmission of data while satisfying both battery and thermal constraints during operation of accessory device 107.

Energy Budget Examples

Figure 6A:
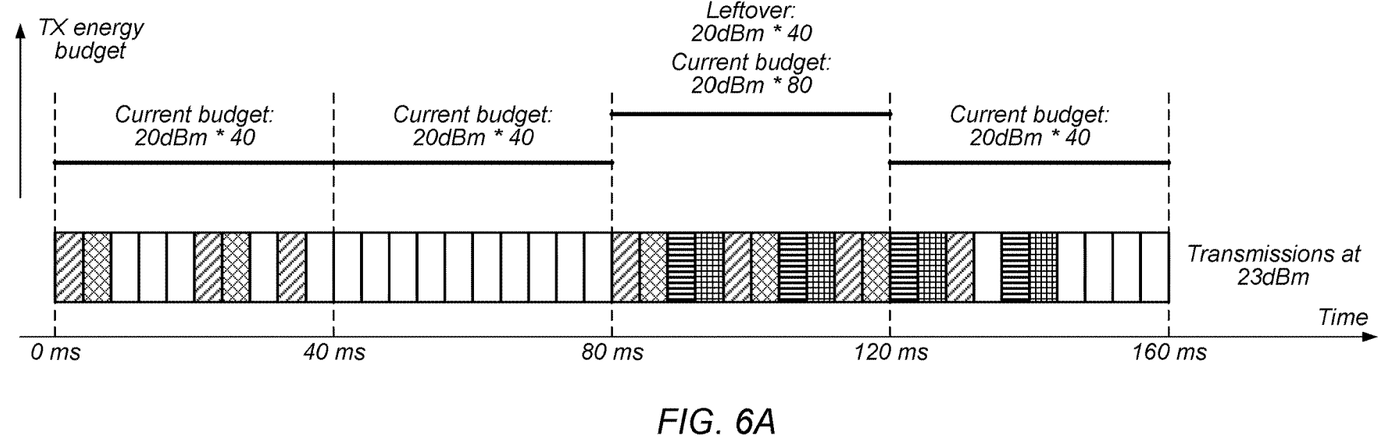
FIGS. 6A-6B illustrate exemplary scheduled transmissions and energy budgets for multiple cycles, according to some embodiments.

FIG. 6A is a diagram illustrating exemplary carryover of leftover budget, according to some embodiments. FIG. 6A shows four exemplary 40 ms cycles of operation of wireless communication circuitry 330. In the illustrated embodiment, each rectangle represents a 4 ms interval, which may correspond to a transmission in TTI bundling mode for a hybrid automatic repeat request (HARQ) process. In the illustrated embodiment, shaded blocks of a particular shading style correspond to the same HARQ process while unshaded blocks indicate that transmissions are not scheduled during the corresponding time interval. To facilitate explanation, in the illustrated embodiment all transmissions are performed at 23 dBm.

In the illustrated example, thermal parameters do not change and E-cltm for each cycle is 20 dBm*40 (which may correspond to transmitting at 20 dBm for 40 ms or at 23 dBm for 20 ms). In the example of FIG. 6A, preUVLO is not asserted at all, so energy budget module 410 operates in thermal mode.

For the cycle beginning at 0 ms, E-budget is 20 dBm*40. E-leftover is zero after the cycle beginning at 0 ms, because the entire energy budget is used for the illustrated five transmissions, transmitting at 23 dBm for 20 ms (E-scheduled=E-budget).

For the cycle beginning at 40 ms, E-budget is 20 dBm*40, but E-scheduled is zero. Therefore, E-leftover is the entire E-budget of 20 dBm*40 at the beginning of the next cycle.

For the cycle beginning at 80 ms, the current budget includes the leftover from the previous cycle and is 20 dBm*80. In the illustrated example, this entire budget is used and transmissions occur in each 4 ms interval. Therefore, E-leftover is zero after this cycle. Note that in some embodiments, if E-max were lower than 20 dBm*80, then only a portion of the budget would be scheduled in this cycle and some leftover might carry over to the next cycle.

For the cycle beginning at 120 ms, in the illustrated example, the current budget is 20 dBm*40, which is all used in this cycle.

Figure 6B:
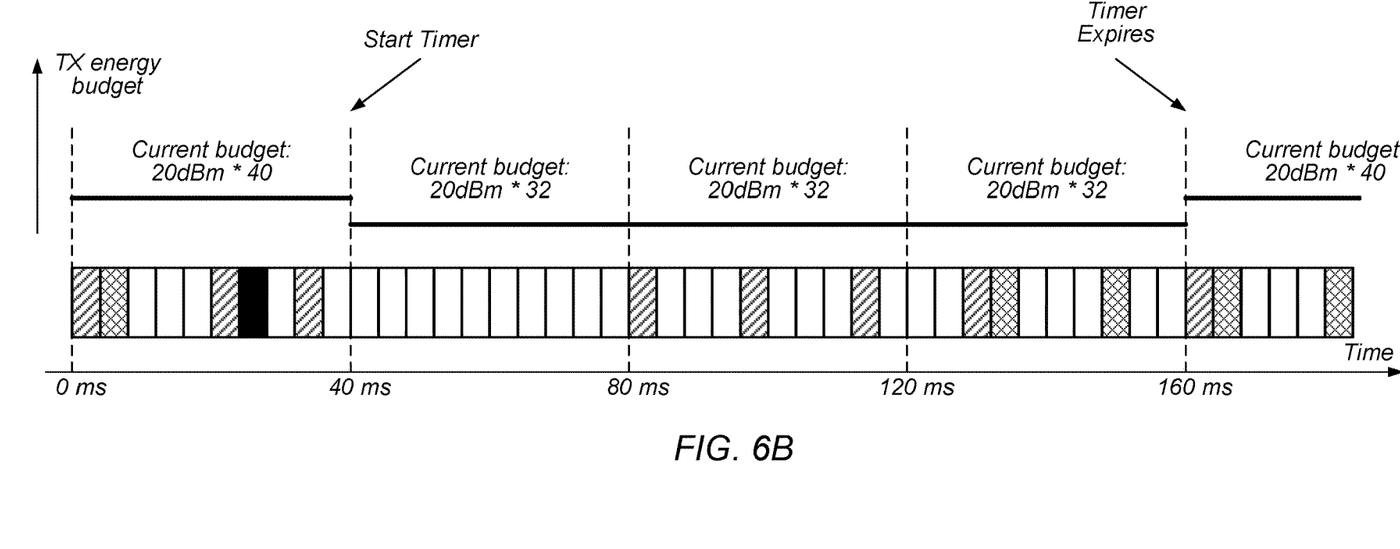

FIG. 6B is a diagram illustrating exemplary blanking caused by assertion of a battery signal (preUVLO in this example). In the illustrated example, four and a half 40 ms cycles are shown. The solid rectangle at 24 ms corresponds to a scheduled transmission that was blanked in the cycle beginning at 0 ms. In the illustrated embodiment, this blanking is caused by assertion of preUVLO during the blanked 4 ms interval.

For the cycle beginning at 0 ms, E-budget is 20 dBm*40. Because preUVLO was asserted during this cycle, energy budget module 410 starts the T-pp timer at the end of the cycle.

Therefore, for the cycle beginning at 40 ms, E-budget is determined based on E-used (20 dBm*32), E-min, and E-cltm (20 dBm*40). In the illustrated example, E-used is greater than E-min and smaller than E-cltm, so E-budget=E-used. Said another way, for an interval after assertion of the battery signal, cycle budget is limited to the energy used in the cycle in which blanking occurred. In the cycle beginning at 40 ms, none of the budget is actually used.

For the cycle beginning at 80 ms, the current budget remains 20 dBm*32 because carryover of leftover budget is not implemented in peak power mode, in this embodiment. For this cycle, three transmissions are performed (note that four transmissions could be performed within the energy budget).

For the cycle beginning at 160 ms, the timer is no longer running and the budget reverts back to being based on E-cltm, which has not changed from the first cycle in the illustrated example.

Exemplary LTE Scheduling Techniques

In some LTE embodiments, wireless communication circuitry 330 may implement one or more of the following techniques when scheduling transmissions based on the determined energy budget for a given cycle.

When transmitting on PUSCH, wireless communication circuitry 330 may measure the average number of HARQ transmission needed for transport blocks (TB) with different sizes and estimate the total TX energy needed for a transport block in a cycle. This may allow wireless communication circuitry 330 to determine whether transmissions can be performed using the allocated energy budget. In some embodiments, wireless communication circuitry 330 gives highest priority to signaling messages (e.g., RRC messages).

In some embodiments, wireless communication circuitry 330 prioritizes TB retransmissions over new transmissions for each active HARQ process. In some embodiments, wireless communication circuitry 330 only allows a new TB transmission on an empty HARQ process when the difference between E-budget and the estimated TX energy for the new TB is greater than a threshold value. In some embodiments, when the threshold is not met, wireless communication circuitry 330 is configured to adjust a buffer status report (BSR) to prevent the network from assigning a grant for a new TB.

Note that, in some embodiments, giving lower priority to new TBs may result in discarding protocol data units (PDUs) from a Packet Data Convergence Protocol (PDCP) buffer. In some embodiments, to avoid or reduce such discarding, wireless communication circuitry 330 is configured to reduce voice codec rate for UL voice frames and/or reduce maximum IP packet size by decreasing the maximum transmission unit (MTU) size.

In some embodiments, wireless communication circuitry 330 is configured to prioritize retransmissions with redundancy version (RV) zero over other RV numbers. This may increase energy efficiency if uplink data can be decoded from an initial RV, in some embodiments.

In some embodiments, wireless communication circuitry 330 is configured to transmit at a lower power in a given cycle rather than blanking or delaying transmissions. For example, consider a case where a transmission requires 23 dBm*4, but only 20 dBm*4 is available in the current E-budget. In some embodiments, if the difference between required power and allowed power is smaller than a threshold value, wireless communication circuitry 330 is configured to perform the transmission using the allowed power in the budget (e.g., perform the transmission at 20 dBm*4 in the previous example). This may be referred to as power back-off. In some embodiments, if the difference is greater than the threshold value, wireless communication circuitry 330 is configured to blank and/or reschedule the transmission.

In some embodiments, wireless communication circuitry 330 may transmit ACK/NAK messages on PUCCH for PDSCH and/or PDCCH if there is not enough TX power for PUSCH. In some embodiments, for PUCCH, wireless communication circuitry 330 is configured to perform power back-off and/or blanking based on a threshold value, as described above with reference to PUSCH (although the threshold may be different than the threshold for PUSCH).

Exemplary WCDMA Scheduling Techniques

In some WCDMA embodiments, wireless communication circuitry 330 implements one or more of the following techniques when scheduling transmissions based on the determined energy budget for a given cycle.

In some embodiments, wireless communication circuitry 330 is configured to give highest priority to the high-speed dedicated physical control channel (HS-DPCCH) for high-speed downlink packet access (HSDPA) ACK/NAK messages. In some embodiments, wireless communication circuitry 330 is configured to give RRC/NAS signaling messages on the dedicated physical data channel (DPDCH) higher priority than other voice or data channels. In some embodiments, wireless communication circuitry 330 is configured to use a transport format combination (TFC) and/or e-TFCI selection for data on DPDCH and/or E-DPDCH to limit UL data throughput and reduce TX power consumption, based on a current energy budget.

In some embodiments, wireless communication circuitry 330 may determine whether to use power back-off or blanking based on a threshold different between allowed power in the budget and required power, e.g., as discussed above with reference to LTE embodiments. In some embodiments, wireless communication circuitry 330 is configured to satisfy an energy budget in a cycle by implementing multiple short TX blanking intervals randomly distributed or distributed in a pre-determined sequence in the cycle to attain a desired TX duty cycle. It may be more difficult to reduce TX power in WCDMA than in LTE without destroying the transmission time interval (TTI) of frames, therefore such short TX blanking may be used to schedule transmissions within a determined TX energy budget.

Power back-off or blanking may be performed in various WCDMA scenarios. During voice communications, for example, an 80% duty cycle may be maintained on DPDCH for voice data and an 80% duty cycle on DPCCH for control information. During silence or listen intervals, a 25% duty cycle may be maintained on DPCCH only. During data upload, a 50% duty cycle may be maintained for data on DPDCH with 20 ms transmission time intervals (e.g., by restricting the DPDCH transport format combination (TFC) selection procedure), while a 90% duty cycle may be maintained for DPCCH. In another data upload scenario, a 20% duty cycle may be maintained on E-DPDCH (e.g., by restricting E-DPDCH TFC selection procedure) with a transmission time intervals of 2 ms along with an 80% duty cycle on DPDCH with a transmission time intervals of 10 ms and an 80% duty cycle on DPCCH. The particular duty cycles, channels used, types of communications, etc. may be adjusted to meet the transmission energy budget in each time cycle (e.g., 40 ms in some embodiments).

Although various LTE and WCDMA techniques have been disclosed herein for purposes of illustration, these technologies are not intended to limit the scope of the present disclosure. In other embodiments, similar techniques may be used in any of various appropriate radio access technologies.

High-Priority Transmission Mode

In some embodiments, wireless communication circuitry 330 is configured to operate in a high-priority mode. In some embodiments, wireless communication circuitry 330 asserts a hardware signal to other components when operating in this mode. The other components may reduce energy usage until the signal is de-asserted. In some embodiments, wireless communication circuitry 330 operates in the high-priority mode for critical RRC signaling messages, for example. In some embodiments, wireless communication circuitry 330 is configured not to utilize the energy budget techniques discussed above when operating in the high-priority transmission mode.

Exemplary Method

Figure 7:
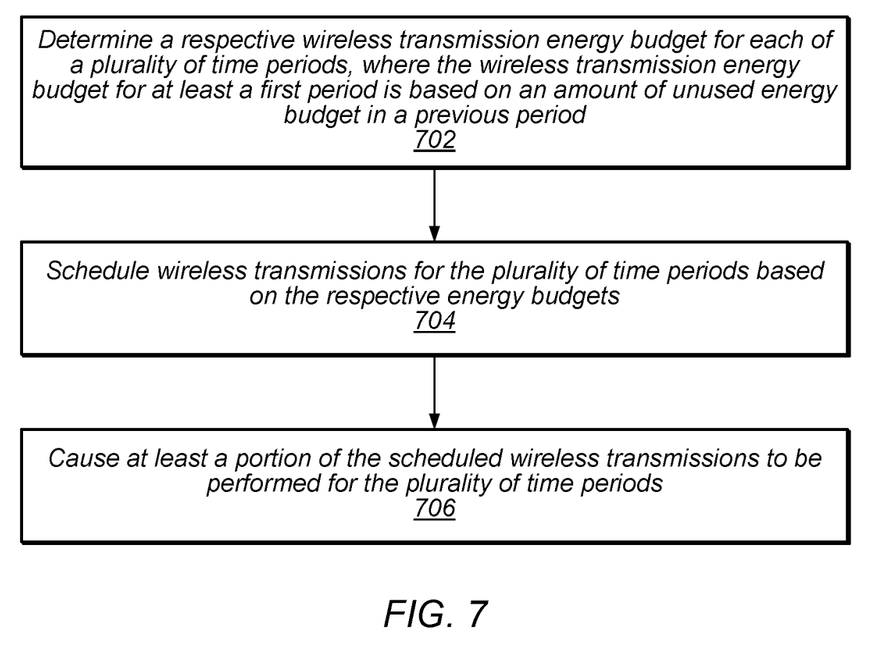
FIG. 7 is a flow diagram illustrating a method, according to some embodiments.

FIG. 7 is a flow diagram illustrating a method for operating wireless circuitry, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 702, in the illustrated embodiment, wireless communication circuitry 330 determines a respective wireless transmission energy budget for each of a plurality of time periods, where the wireless transmission energy budget for at least a first period is based on an amount of unused energy budget in a previous period. In some embodiments, the first period corresponds to a first mode of operation which may be a thermal mode of operation. The period from 80 ms to 120 ms in FIG. 6A is one example of such a period. The energy budget for the first period may further be determined based on thermal information.

In some embodiments, wireless communication circuitry 330 also operates in a second mode of operation (e.g., a peak power mode) in which the wireless transmission energy budget for one or more time periods is based on an amount of energy used for wireless transmissions in a most recent period in which transmissions were blanked in response to a battery signal. The three periods beginning at 40 ms and ending at 160 ms in FIG. 6B are examples of such periods.

At 704, in the illustrated embodiment, wireless communication circuitry 330 schedules wireless transmissions for the plurality of time periods based on the respective energy budgets. This may be performed by scheduling HARQ transmissions or retransmissions in LTE, inserting blanking intervals into WCDMA frames to achieve a desired duty cycle, etc.

At 706, in the illustrated embodiment, wireless communication circuitry 330 causes at least a portion of the scheduled wireless transmissions to be performed for the plurality of time periods. In some embodiments, some of the scheduled transmissions may be blanked, e.g., when they intersect with assertion of a battery signal such as preUVLO.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or accessory device 107) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
 wireless communication circuitry; and
 a processor operably coupled to the wireless communication circuitry, wherein the processor is configured to cause the UE to:
  determine first thermal information for the UE;
  determine a respective wireless transmission energy budget for each of a plurality of time periods, wherein the wireless transmission energy budget for at least a first period is based on:
   an amount of unused energy budget in a previous period; and
  the first thermal information;
   create a schedule of wireless transmissions for the plurality of time periods based on the respective energy budgets; and
   perform at least a portion of the scheduled wireless transmissions for the plurality of time periods according to the schedule.

2. The UE of claim 1, further comprising:
 a plurality of thermal sensors, wherein the first thermal information is determined based on signals from the plurality of thermal sensors.

3. The UE of claim 2, wherein the plurality of thermal sensors are associated with a plurality of components of the UE.

4. The UE of claim 1, wherein the processor is further configured to cause the UE to:
 determine a first maximum energy budget for a time period; and
 determine a second maximum energy budget for a time period based on thermal information, wherein the wireless transmission energy budget for the first period is calculated as a lessor of:
  the amount of unused energy budget in the previous period plus the second maximum energy budget; and
  the first maximum.

5. The UE of claim 1, wherein the processor is further configured to cause the UE to:
 at a second time:
  determine second thermal information, wherein the second thermal information indicates a change in conditions relative to the first thermal information; and
  determine a wireless transmission energy budget for a second period, wherein the amount of unused energy budget in the previous period is adjusted in response to the change in conditions.

6. An apparatus, comprising:
 one or more processing elements configured to:
 determine thermal information for the apparatus;
 determine a respective wireless transmission energy budget for each of a plurality of time periods, wherein the wireless transmission energy budget for at least a first period is based on:
  an amount of unused energy budget in a previous period; and
  the thermal information;
 schedule wireless transmissions for the plurality of time periods based on the respective wireless transmission energy budgets; and
 cause at least a portion of the scheduled wireless transmissions to be performed for the plurality of time periods.

7. The apparatus of claim 6, wherein the thermal information is component-level thermal information based on thermal sensors included in a plurality of components of the apparatus.

8. The apparatus of claim 6, wherein the one or more processing elements are further configured to:
 for at least one respective time period of the plurality of time periods:
  determine a difference between the respective wireless transmission energy budget for the respective time period and an amount of energy to perform a wireless transmission;

compare the difference to a threshold; and perform the wireless transmission at a lower power in response to the comparison.

9. The apparatus of claim 8, wherein the one or more processing elements are further configured to:

determine the threshold based on the signal.

10. The apparatus of claim 6, wherein one or more processing elements are configured not to consider leftover energy budget from a previous period in determining the energy budget for a current period if the thermal information for the apparatus changed from the previous period to the current period.

11. The apparatus of claim 6, wherein to schedule wireless transmissions for at least one of the time periods, the one or more processing elements are configured to prioritize retransmissions over new transmissions.

12. The apparatus of claim 6, wherein, to schedule wireless transmissions for code division multiple access (CDMA) communications in at least one of the time periods, the one or more processing elements are configured to perform blanking during intervals randomly distributed in the at least one of the time periods in order to satisfy the determined energy budget for the at least one of the time periods.

13. The apparatus of claim 6, wherein the one or more processing elements are further configured to:

at a second time:

determine to transmit a signaling message;

operate in a high-priority transmission mode in response to determining to transmit the signaling message; and cause the signaling message to be transmitted while operating in the high-priority transmission mode.

14. The apparatus of claim 13, wherein to operate in the high-priority transmission mode the one or more processing elements are further configured to:

assert a hardware signal to at least one other component, wherein the hardware signal is configured to cause the at least one other component to reduce energy usage.

15. The apparatus of claim 14, wherein to operate in the high-priority transmission mode the one or more processing elements are further configured to:

determine a second wireless transmission energy budget for transmission of the signaling message, wherein the second wireless transmission energy budget is not based on:

an amount of unused energy budget in a previous period; or the thermal information.

16. The apparatus of claim 15, wherein the one or more processing elements are further configured to:

de-assert the hardware signal; and cease operating in the high-priority transmission mode.

17. A method, comprising:

determining, by a wireless communication apparatus, thermal information for the wireless communication apparatus;

determining, by the wireless communication apparatus, a respective wireless transmission energy budget for each of a plurality of time periods, wherein the wireless transmission energy budget for at least a first period is based on the thermal information and an amount of unused energy budget in a previous period;

scheduling, by the wireless communication apparatus, wireless transmissions for the plurality of time periods based on the respective energy budgets; and causing, by wireless communication apparatus, at least a portion of the scheduled wireless transmissions to be performed for the plurality of time periods.

18. The method of claim 17, wherein the wireless transmission energy budget for at least the first period is based on a budget based on the thermal information plus the amount of unused energy budget in a previous period.

19. The method of claim 17, wherein causing at least a portion of the scheduled wireless transmissions to be performed comprises performing at least one transmission at a reduced power.

20. The method of claim 17, wherein causing at least a portion of the scheduled wireless transmissions to be performed comprises blanking at least one transmission.

* * * * *